(12) United States Patent
Petrovski et al.

(10) Patent No.: US 10,926,490 B2
(45) Date of Patent: Feb. 23, 2021

(54) COMPOSITE LAMINATE FORMING APPARATUS AND METHOD THEREFOR

(71) Applicant: The Boeing Company, Chicago, IL (US)

(72) Inventors: Goce Petrovski, Melbourne (AU); Steven Kokarevski, Melbourne (AU)

(73) Assignee: The Boeing Company, Chicago, IL (US)

( * ) Notice: Subject to any disclaimer, the term of this patent is extended or adjusted under 35 U.S.C. 154(b) by 113 days.

(21) Appl. No.: 15/948,106

(22) Filed: Apr. 9, 2018

(65) Prior Publication Data

US 2019/0308377 A1 Oct. 10, 2019

(51) Int. Cl.
| | | |
|---|---|---|
| *B29C 70/38* | (2006.01) | |
| *B29C 70/54* | (2006.01) | |
| *B32B 43/00* | (2006.01) | |
| *B29C 65/00* | (2006.01) | |
| B29K 307/04 | (2006.01) | |
| B29K 105/08 | (2006.01) | |
| B29L 31/30 | (2006.01) | |

(52) U.S. Cl.
CPC ........ *B29C 70/38* (2013.01); *B29C 66/81463* (2013.01); *B29C 66/863* (2013.01); *B29C 70/545* (2013.01); *B32B 43/006* (2013.01); *B29C 2793/0072* (2013.01); *B29K 2105/0809* (2013.01); *B29K 2307/04* (2013.01); *B29L 2031/3076* (2013.01)

(58) Field of Classification Search
CPC . B29C 66/81463; B29C 66/863; B29C 70/38; B29C 70/386; B29C 70/388; B29C 70/541; B29C 70/543; B29C 70/545; B29C 2793/0072; B29C 31/002; B32B 43/006; B29K 2105/0809; B29K 2307/04; B29L 2031/3076
See application file for complete search history.

(56) References Cited

U.S. PATENT DOCUMENTS

| | | | |
|---|---|---|---|
| 4,536,980 A | 8/1985 | Fleming | |
| 10,160,169 B1 * | 12/2018 | Lutz | ........................ B29C 70/34 |

(Continued)

FOREIGN PATENT DOCUMENTS

| | | | | |
|---|---|---|---|---|
| DE | 102016119940 A1 * | 4/2018 | ............. | B29C 31/08 |
| WO | WO-2017005770 A1 * | 1/2017 | ............. | B32B 15/04 |

OTHER PUBLICATIONS

Bjornsson et al., "Low-cost Automation for Prepreg Handling—Two Cases from the Aerospace Industry," (Jan. 2005).

(Continued)

*Primary Examiner* — Michael A Tolin
(74) *Attorney, Agent, or Firm* — Walters & Wasylyna LLC

(57) ABSTRACT

An apparatus is provided for forming a composite laminate. The apparatus comprises a mandrel having a surface on which the composite laminate can be formed. The apparatus further comprises an application surface and a conveyor configured to move a composite material piece that has been cut to a desired shape to the application surface. The apparatus also comprises an actuating mechanism for, when actuated, lifting the application surface upward towards the mandrel to apply the composite material piece to the surface of the mandrel to form at least a portion of the composite laminate on the surface of the mandrel.

20 Claims, 16 Drawing Sheets

(56) References Cited

U.S. PATENT DOCUMENTS

| | | | |
|---|---|---|---|
| 2009/0145545 A1* | 6/2009 | Brennan | B29C 70/30 |
| | | | 156/263 |
| 2014/0199153 A1* | 7/2014 | Reinhold | B65H 3/0816 |
| | | | 414/800 |
| 2019/0240929 A1* | 8/2019 | Graf | B29C 65/787 |

OTHER PUBLICATIONS

Bjornsson et al., "Automated Removal of Prepreg Backing Paper—A Sticky Problem," (Sep. 17, 2013).

* cited by examiner

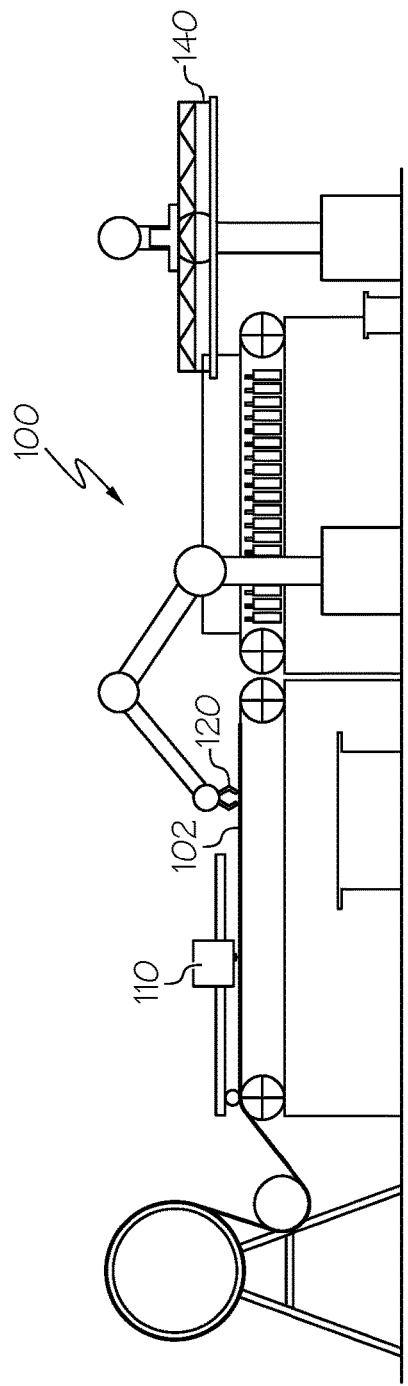
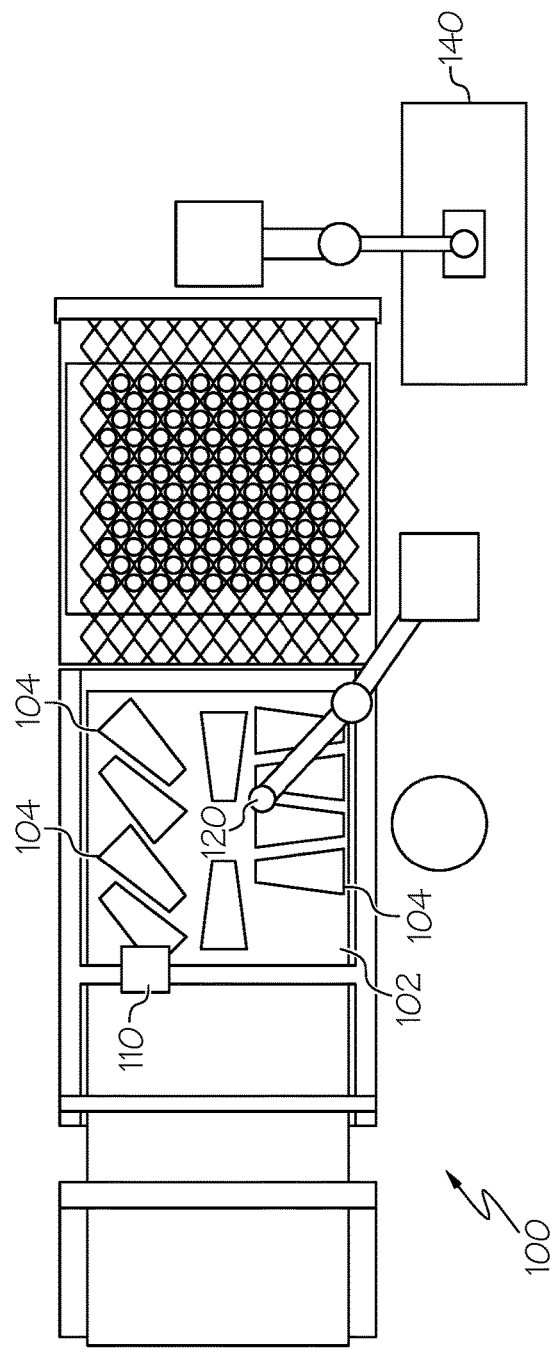
FIG. 3A
FIG. 3B

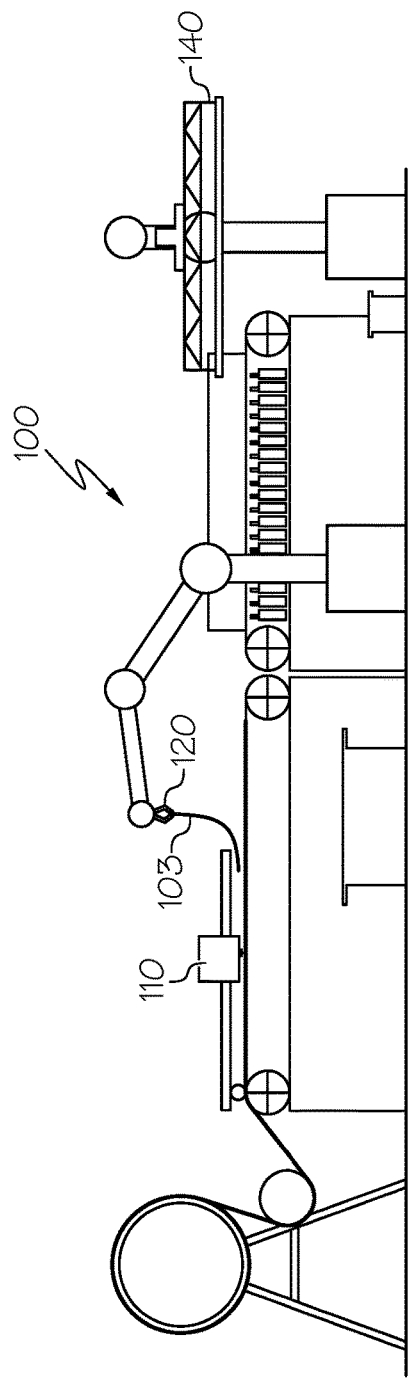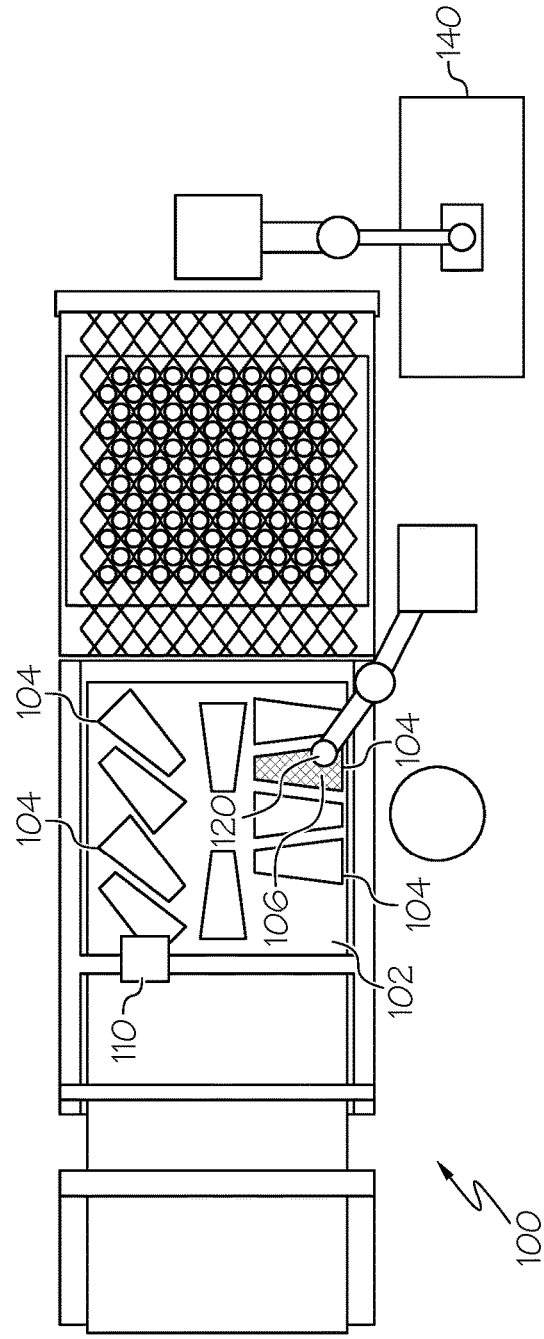
FIG. 4A
FIG. 4B

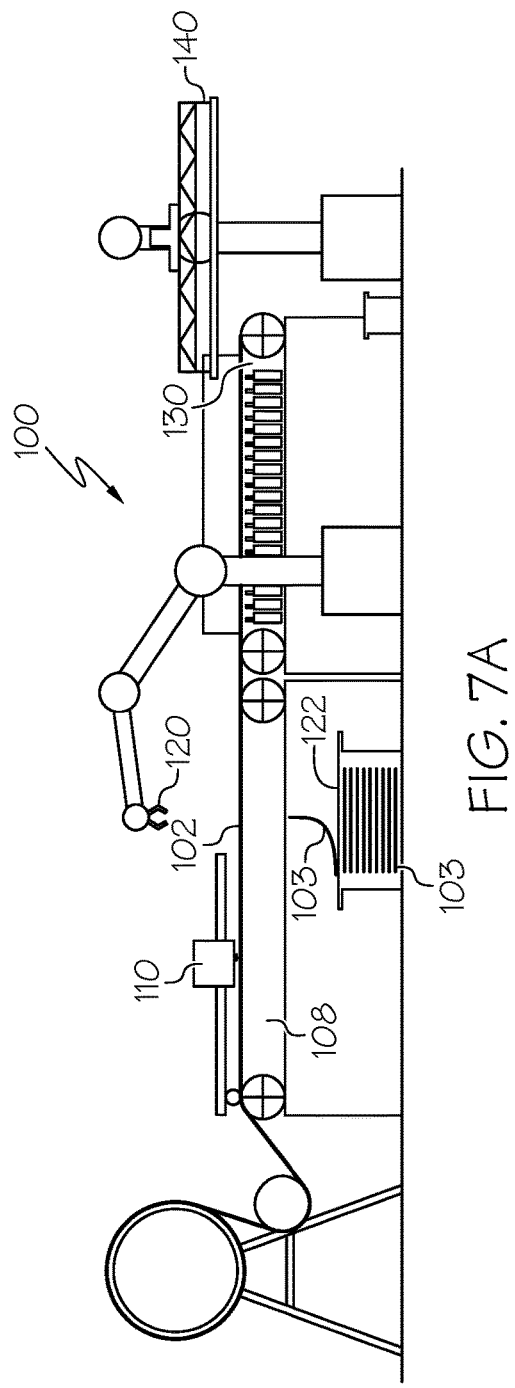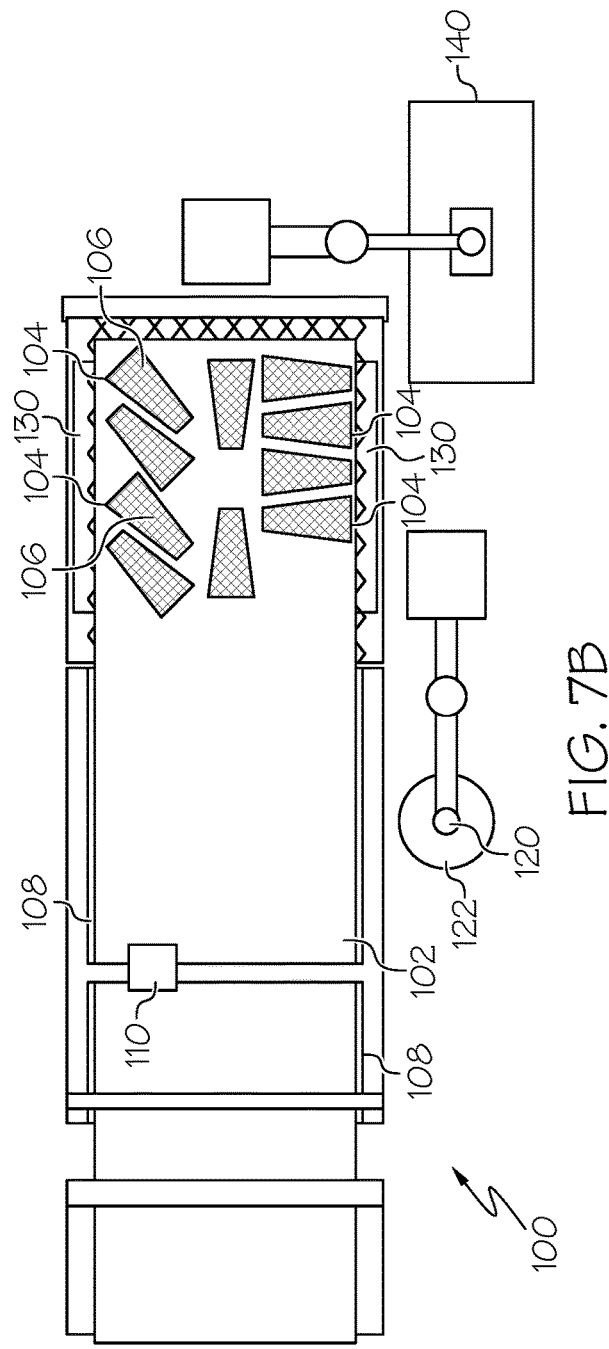

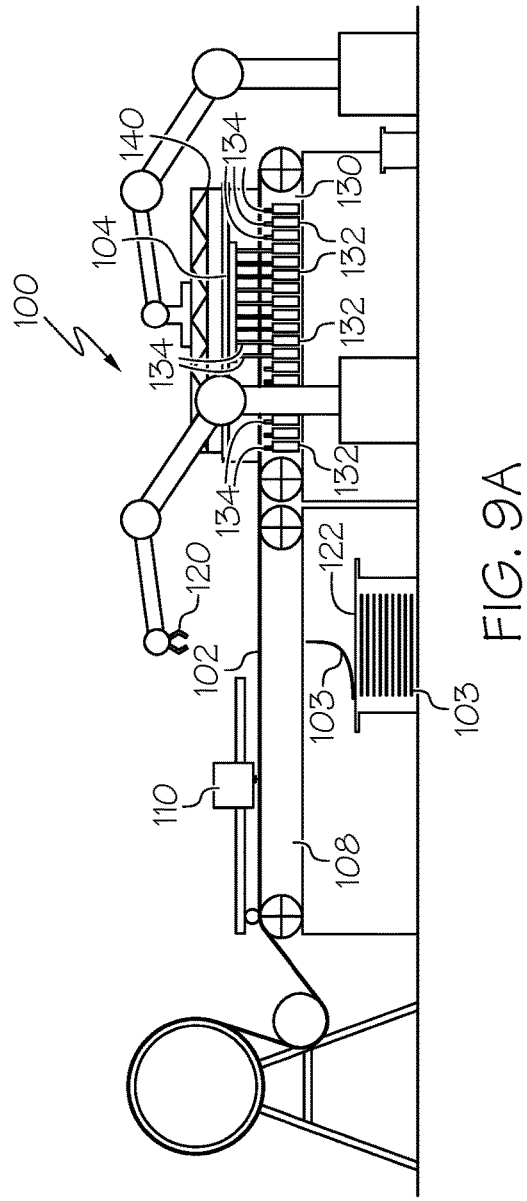
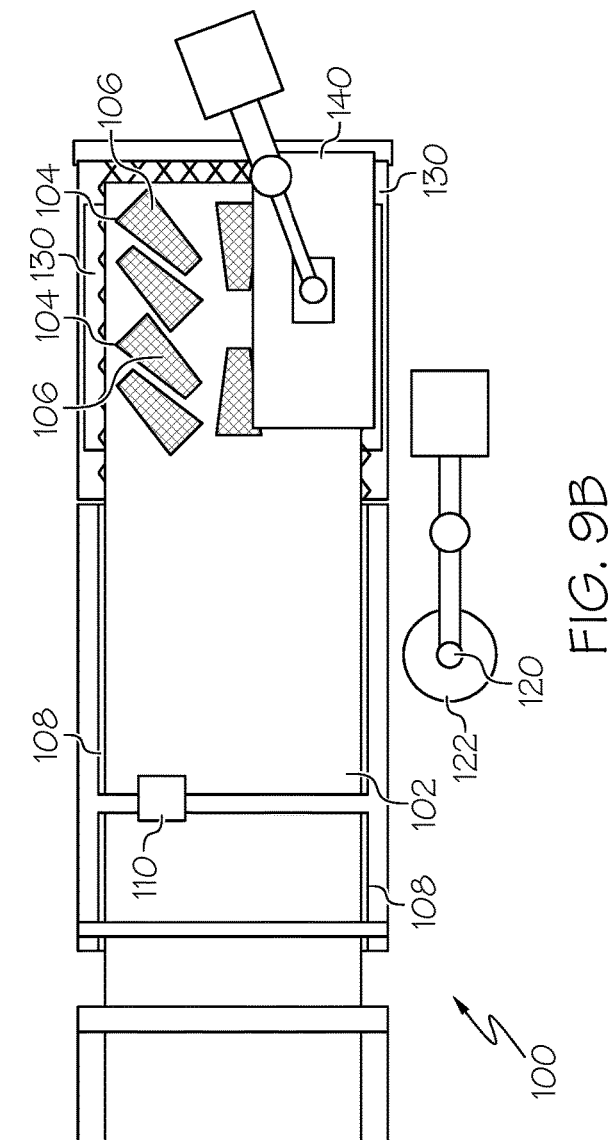

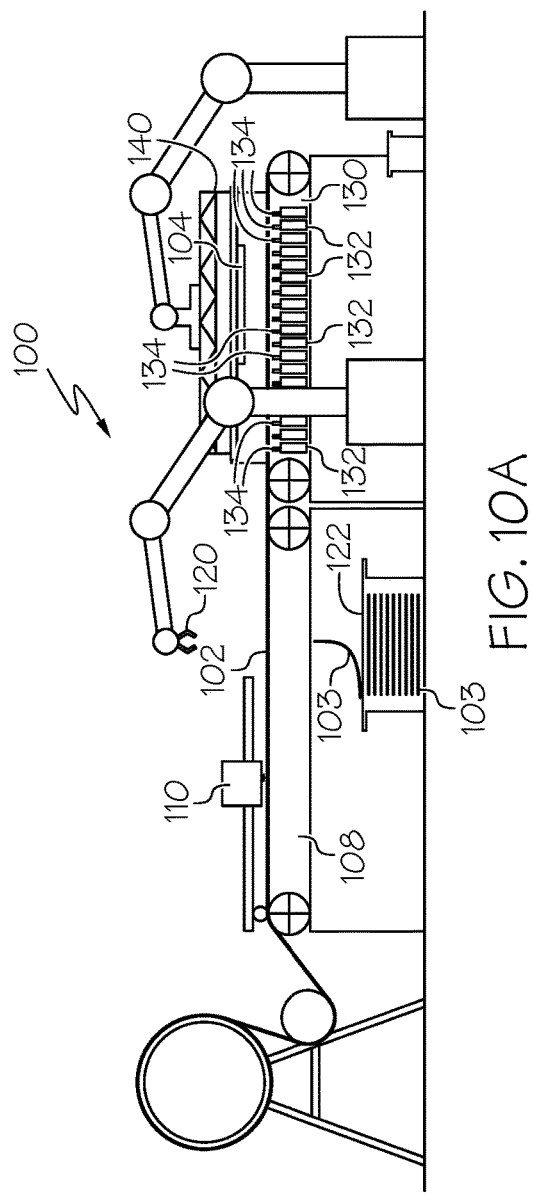
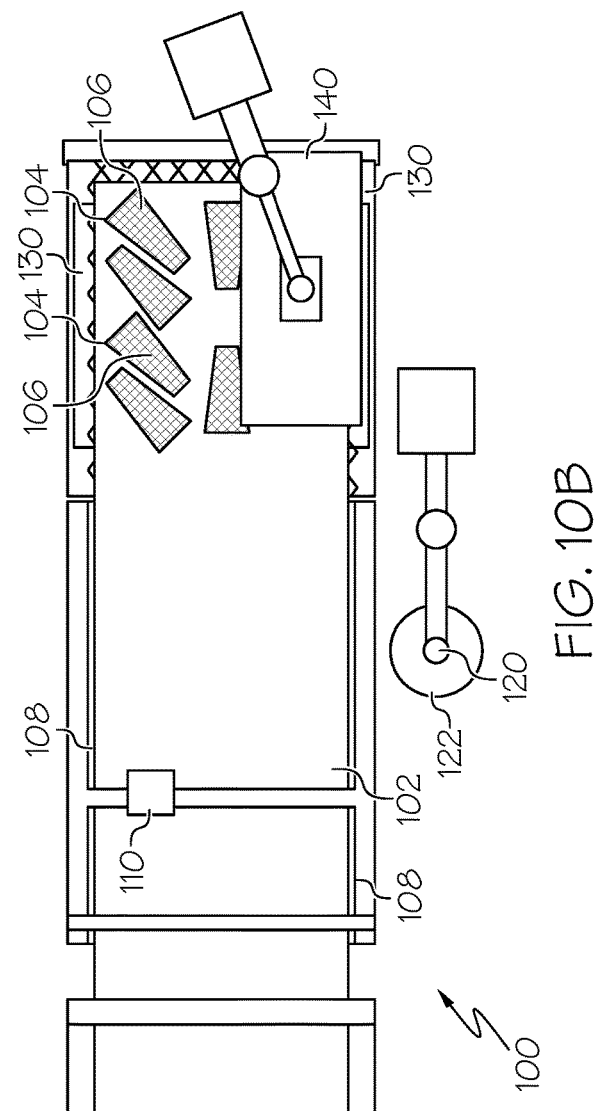
FIG. 10A
FIG. 10B

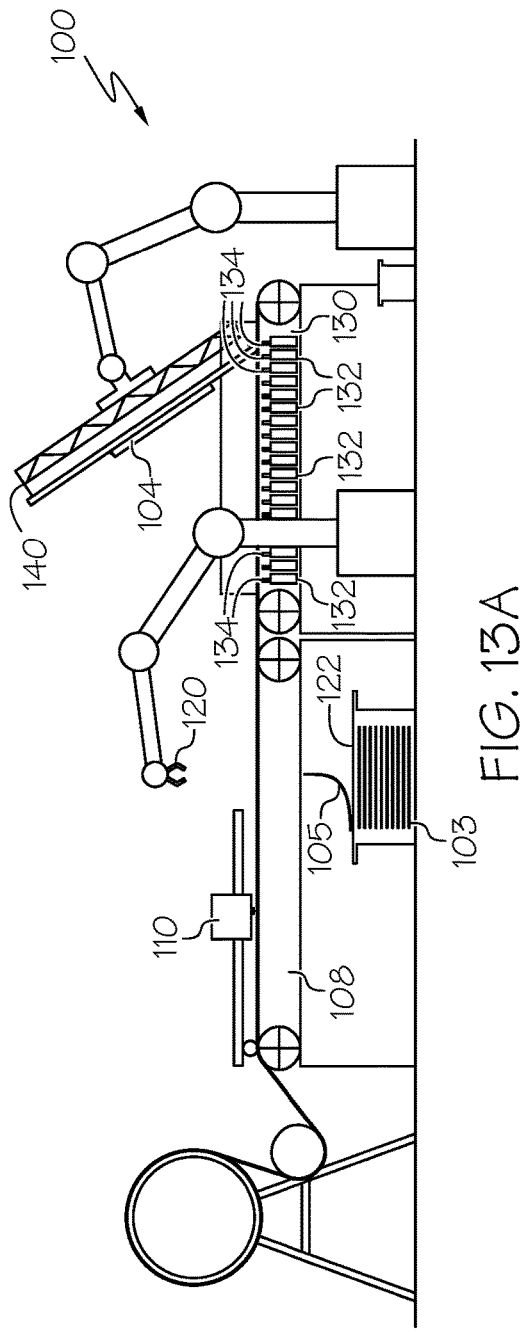
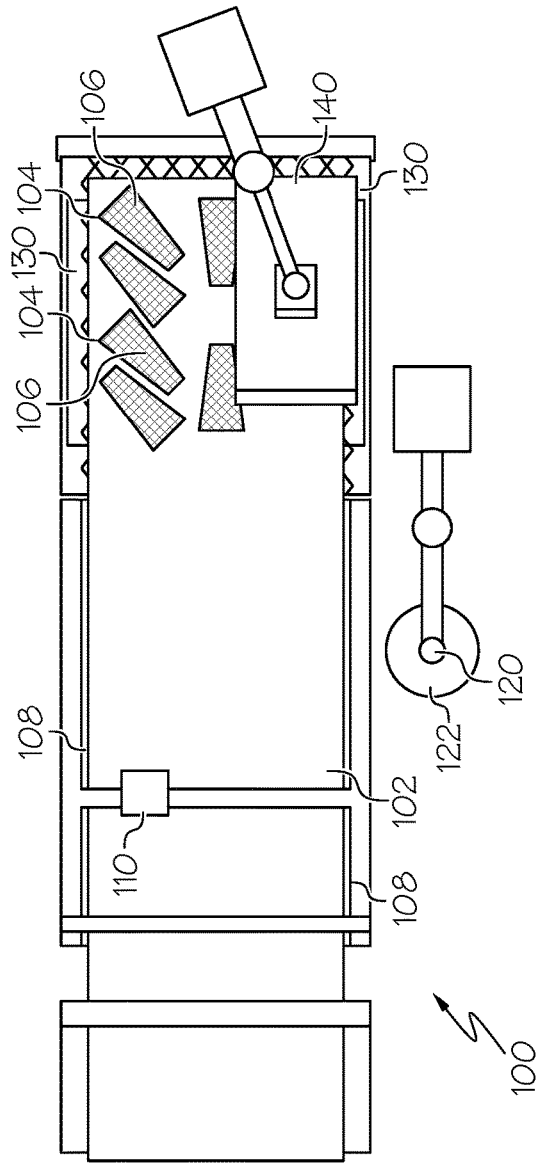
FIG. 13A
FIG. 13B

COMPOSITE LAMINATE FORMING APPARATUS AND METHOD THEREFOR

FIELD

The present application relates to composite laminates and, more particularly, to a composite laminate forming apparatus and method therefor.

BACKGROUND

A composite laminate is usually formed using a cutting machine and a layup mandrel. The cutting machine cuts pieces of fabric material, and the cut fabric pieces are then moved from the cutting machine and placed on the layup mandrel to form the composite laminate. The known ways of moving cut fabric pieces to a layup mandrel and placing the cut fabric pieces on the layup mandrel are labor-intensive and time-consuming. It would be desirable to overcome drawbacks of known ways of moving and placing cut fabric pieces on a layup mandrel to form a composite laminate.

SUMMARY

In one aspect, an apparatus is provided for forming a composite laminate. The apparatus comprises a mandrel having a surface on which the composite laminate can be formed. The apparatus further comprises an application surface and a conveyor configured to move a composite material piece that has been cut to a desired shape to the application surface. The apparatus also comprises an actuating mechanism for, when actuated, lifting the application surface upward towards the mandrel to apply the composite material piece to the surface of the mandrel to form at least a portion of the composite laminate on the surface of the mandrel.

In another aspect, an apparatus is provided for forming a composite laminate on a bottom surface of an inverted mandrel. The apparatus comprises an actuating mechanism for, when actuated, lifting a composite material piece to the bottom surface of the inverted mandrel to form at least a portion of the composite laminate on the bottom surface of the inverted mandrel.

In yet another aspect, a method is provided for forming a composite laminate. The method comprises conveying a composite material piece that has been cut to a desired shape to a first portion of an application surface. The method further comprises after the composite material piece has been conveyed to the first portion of the application surface, moving a second portion of the application surface towards a mandrel to form at least a portion of the composite laminate on a surface of the mandrel.

In still another aspect, a method is provided for forming a composite laminate. The method comprises automatically cutting a composite ply with a backing material to a desired shape, and removing the backing material from the cut composite ply. The method further comprises moving the cut composite ply to an application surface, and applying the cut composite ply to a mandrel using the application surface.

Other aspects will become apparent from the following detailed description, the accompanying drawings and the appended claims.

BRIEF DESCRIPTION OF THE DRAWINGS

FIG. 3A is an elevational view similar to FIG. 2A and showing the composite laminate forming apparatus in which a picker is moved into position over a cut piece of fabric material.

FIG. 3B is a top view of the composite laminate forming apparatus of FIG. 3A.

FIG. 4A is an elevational view similar to FIG. 3A and showing the composite laminate forming apparatus in which backing material is removed from the cut piece of fabric material.

FIG. 4B is a top view of the composite laminate forming apparatus of FIG. 4A.

FIG. 7A is an elevational view similar to FIG. 6A and showing the composite laminate forming apparatus in which all cut pieces of fabric material with their backing material removed are moved and positioned over a mesh conveyor.

FIG. 7B is a top view of the composite laminate forming apparatus of FIG. 7A.

FIG. 9A is an elevational view similar to FIG. 8A and showing the composite laminate forming apparatus in which certain actuators of a matrix electromechanical actuators are actuated and extend towards the inverted layup mandrel to lift one of the cut pieces of fabric material towards the inverted layup mandrel to adhere to the inverted layup mandrel.

FIG. 9B is a top view of the composite laminate forming apparatus of FIG. 9A.

FIG. 10A is an elevational view similar to FIG. 9A and showing the composite laminate forming apparatus in which the certain actuators of the matrix of electromechanical actuators are de-actuated and retracted away from the inverted layup mandrel.

FIG. 10B is a top view of the composite laminate forming apparatus of FIG. 10A.

FIG. 13A is an elevational view similar to FIG. 12A and showing the composite laminate forming apparatus in which the removed underside backing material is discarded.

FIG. 13B is a top view of the composite laminate forming apparatus of FIG. 13A.

DETAILED DESCRIPTION

The present application is directed to a composite laminate forming apparatus and method therefor. The specific construction of the composite laminate forming apparatus and the industry in which the apparatus and method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes an apparatus and method for forming a composite laminate for an airplane part. The composite laminate forming apparatus and method may be implemented by an original equipment manufacturer (OEM) in compliance with military and space regulations. It is conceivable that the disclosed composite laminate forming apparatus and method may be implemented in many other composite manufacturing industries.

Figure 1A:
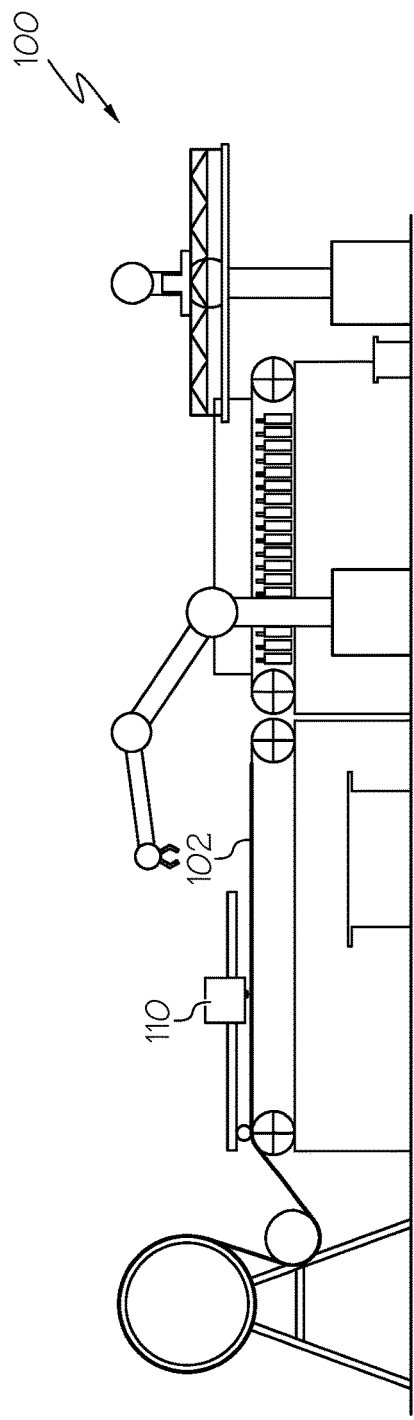
FIG. 1A is an elevational view of an example composite laminate forming apparatus in a starting state and constructed in accordance with an embodiment.
Figure 1B:
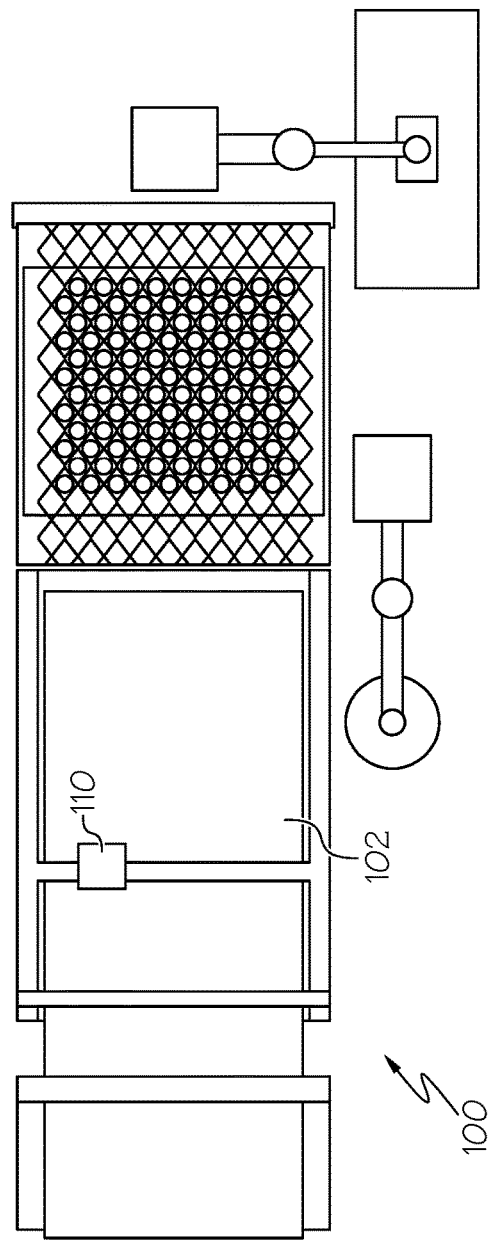
FIG. 1B is a top view of the composite laminate forming apparatus of FIG. 1A.

Referring to FIG. 1A, an elevational view of an example composite laminate forming apparatus 100 in a starting state and constructed in accordance with an embodiment is illustrated. FIG. 1B is a top view of the composite laminate forming apparatus 100 of FIG. 1A.

Figure 2A:
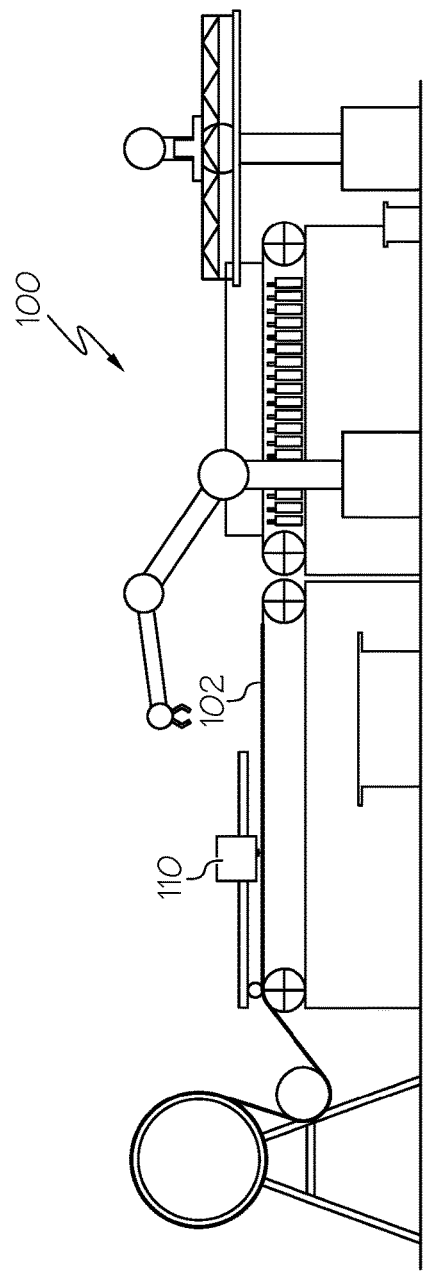
FIG. 2A is an elevational view similar to FIG. 1A and showing the composite laminate forming apparatus in which pieces of fabric material are cut.
Figure 2B:
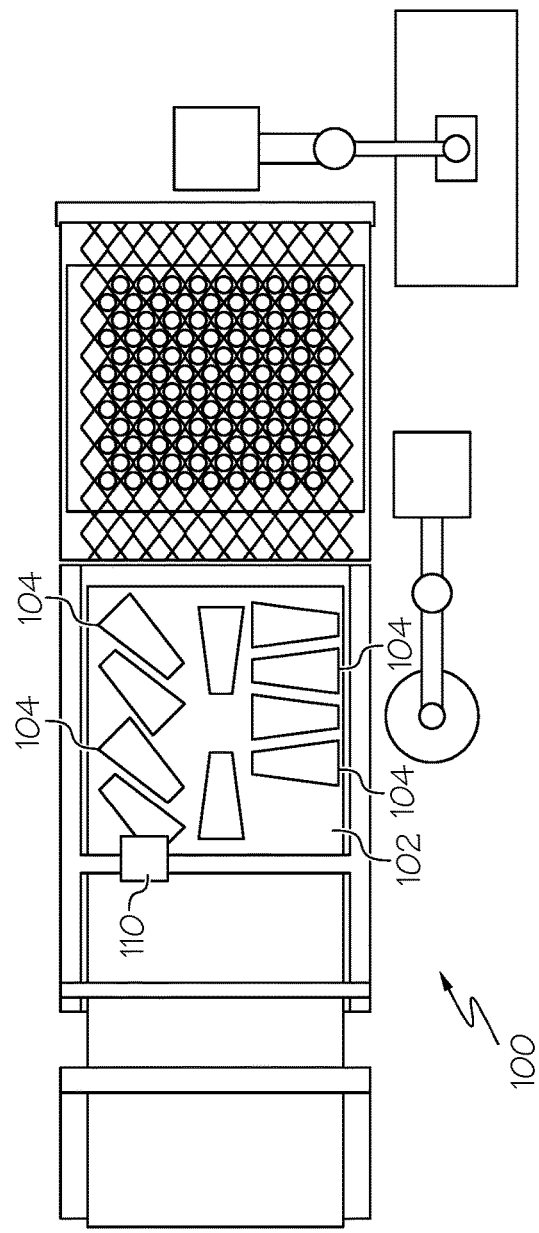
FIG. 2B is a top view of the composite laminate forming apparatus of FIG. 2A.

The apparatus 100 comprises a cutting machine 110 that defines a cutting area and that is configured to cut a sheet 102 of composite fabric material into pieces that will form plies of a composite laminate. FIG. 2A is an elevational view similar to FIG. 1A, and shows pieces 104 of fabric material that are cut from the sheet 102 of composite fabric material. FIG. 2B is a top view of the composite laminate forming apparatus of FIG. 2A. The cutting machine 110 may comprise any suitable commercially-available cutting machine. Structure and operation of cutting machines are known and conventional and, therefore, will not be described.

Referring to FIG. 3A, an elevational view similar to FIG. 2A and showing the composite laminate forming apparatus 100 in which a robotically-controlled picker 120 is moved into position over one of the cut pieces 104 of fabric material. FIG. 3B is a top view of the composite laminate forming apparatus of FIG. 3A. The picker 120 is configured to remove backing material from the one of the cut pieces 104 of fabric material, thereby exposing an adherable (e.g., tacky) top surface 106 (FIG. 4B) of the cut piece 104, which may be pressed and adhered to the inverted layup mandrel 140, as is described herein. As shown in FIG. 4A which is an elevational view similar to FIG. 3A, backing material 103 is removed from the one of the cut pieces 104 of fabric material. FIG. 4B is a top view of the composite laminate forming apparatus of FIG. 4A.

Figure 5A:
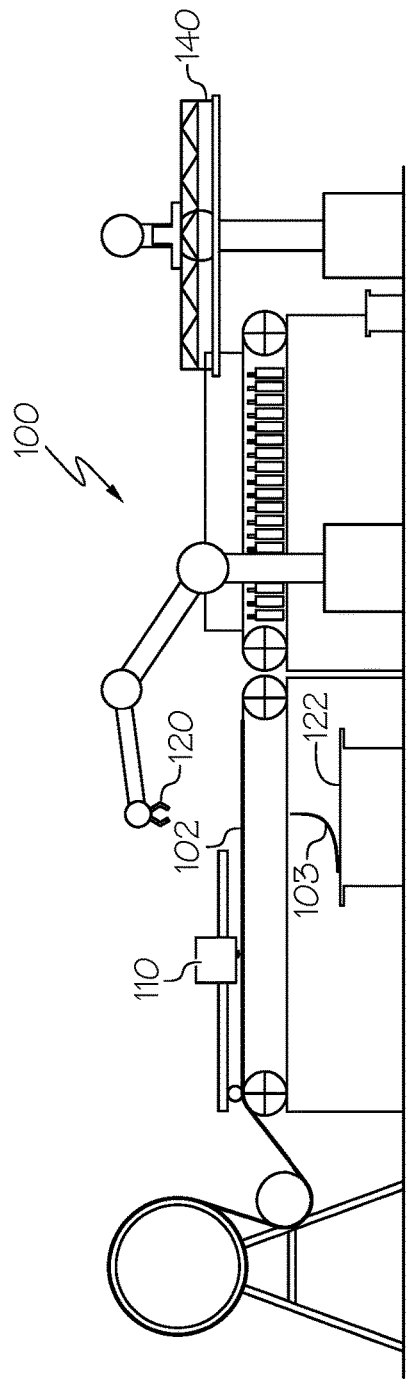
FIG. 5A is an elevational view similar to FIG. 4A and showing the composite laminate forming apparatus in which the removed backing material is discarded.
Figure 5B:
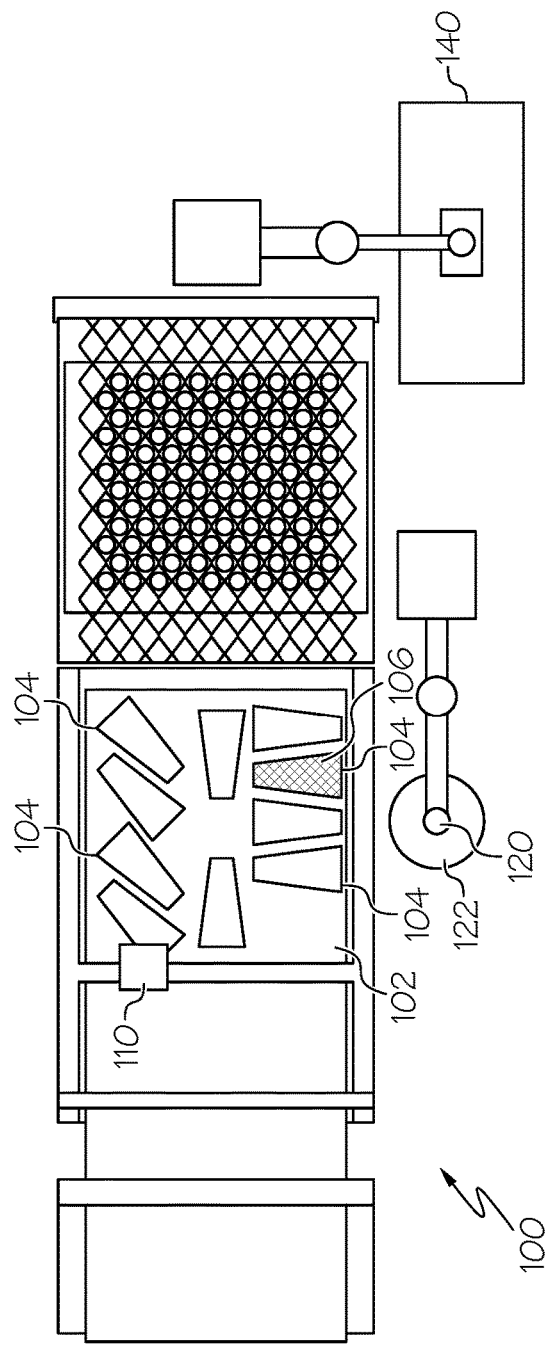
FIG. 5B is a top view of the composite laminate forming apparatus of FIG. 5A.
Figure 6A:
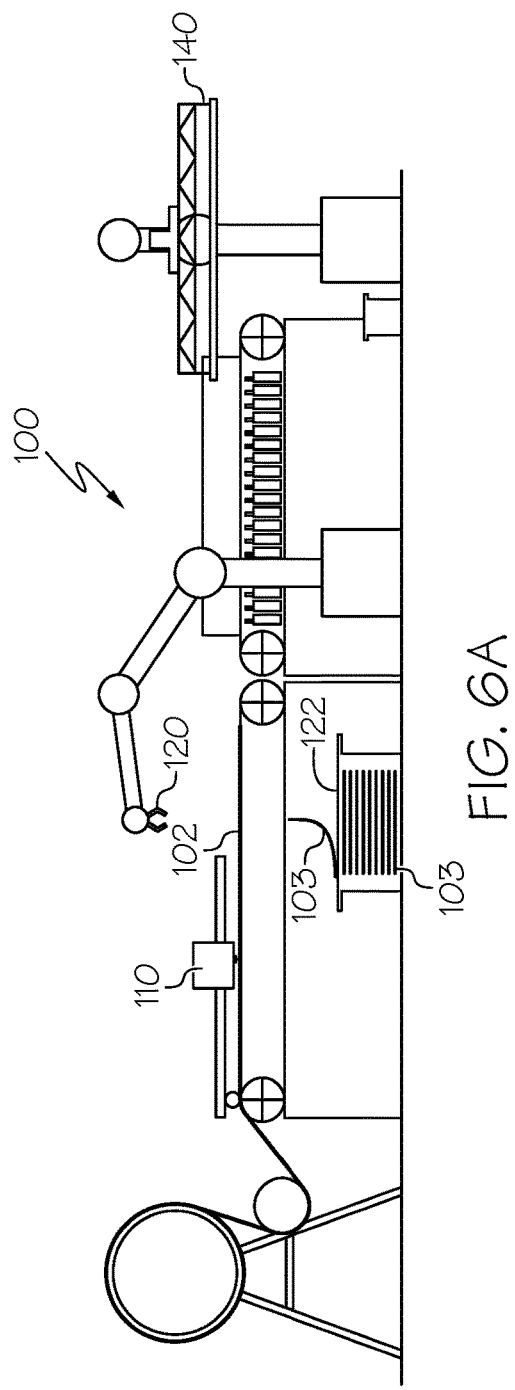
FIG. 6A is an elevational view similar to FIG. 5A and showing the composite laminate forming apparatus in which backing material is removed from all cut pieces of fabric material.
Figure 6B:
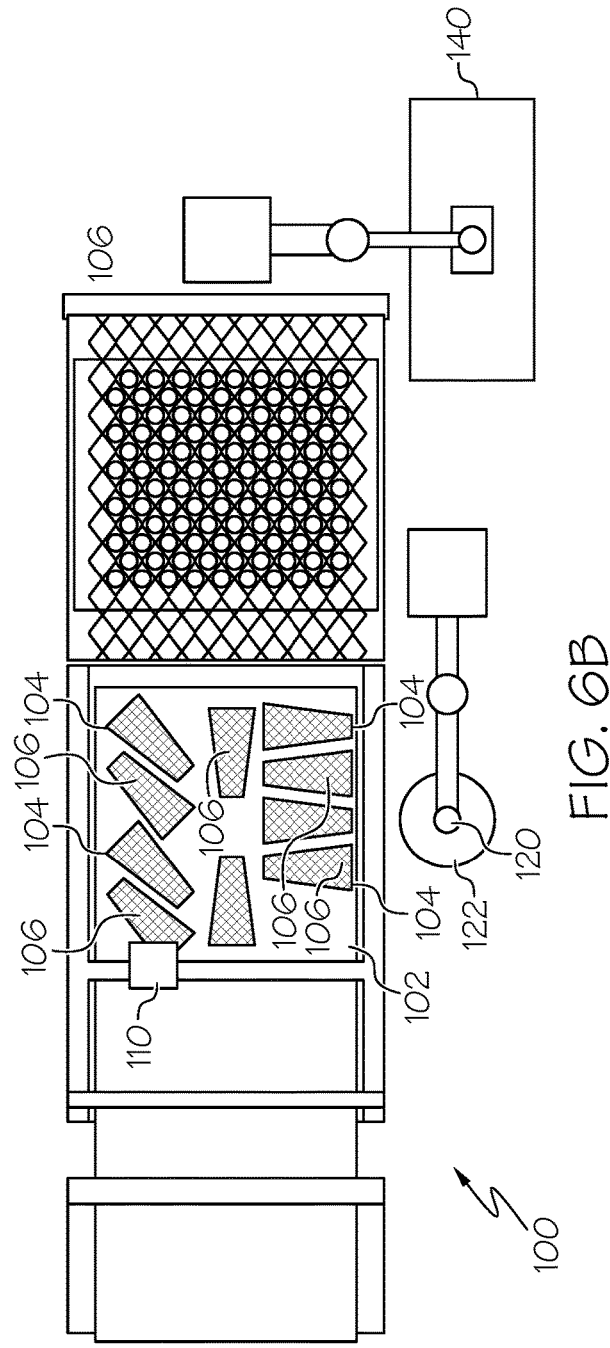
FIG. 6B is a top view of the composite laminate forming apparatus of FIG. 6A.

Referring to FIG. 5A, an elevational view similar to FIG. 4A and showing the composite laminate forming apparatus 100 in which the removed backing material 103 is discarded into a bin 122. FIG. 5B is a top view of the composite laminate forming apparatus of FIG. 5A. The picker 120 then removes backing material 103 from all of the other cut pieces 104 of fabric material as shown in FIG. 6A, which is an elevational view similar to FIG. 5A, thereby exposing the adherable (e.g., tacky) top surfaces 106 (FIG. 6B) of all the cut pieces 104, which may be pressed and adhered to the inverted layup mandrel 140, as is described herein. FIG. 6B is a top view of the composite laminate forming apparatus of FIG. 6A. The backing material 103 from all of the other cut pieces 104 of fabric material is discarded into the bin 122 in the same manner. The checkered pattern of each of the cut pieces 104 of fabric material indicates removed backing material.

Referring to FIG. 7A, an elevational view similar to FIG. 6A and showing the composite laminate forming apparatus 100 is illustrated. In FIG. 7A, all of the cut pieces 104 of fabric material with their backing material removed are moved along a belt conveyor 108 and positioned over a mesh conveyor 130. FIG. 7B is a top view of the composite laminate forming apparatus of FIG. 7A.

Figure 8A:
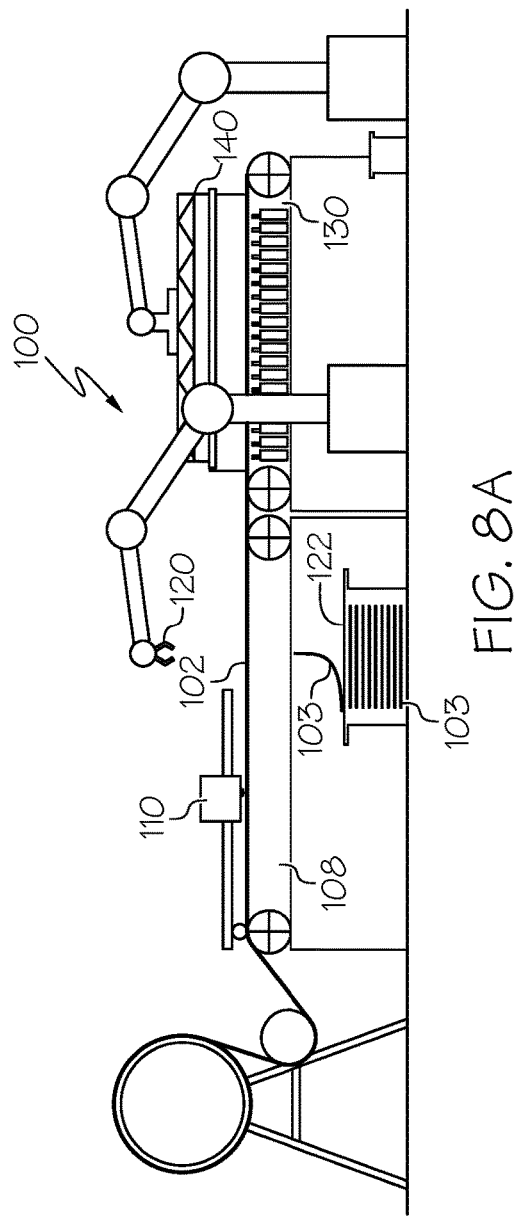
FIG. 8A is an elevational view similar to FIG. 7A and showing the composite laminate forming apparatus in which an inverted layup mandrel is moved over the cut pieces that are positioned on the mesh conveyor.
Figure 8B:
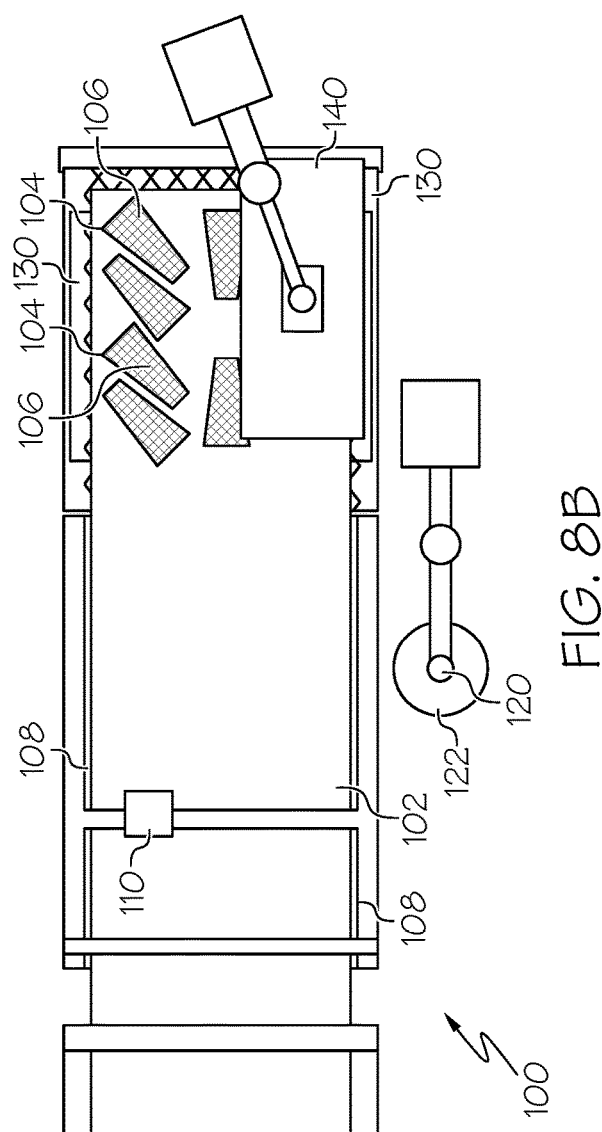
FIG. 8B is a top view of the composite laminate forming apparatus of FIG. 8A.

As shown in FIG. 8A which is an elevational view similar to FIG. 7A, a robotically-controlled inverted layup mandrel 140 is moved over the cut pieces 104 that are positioned on the mesh conveyor 130. FIG. 8B is a top view of the composite laminate forming apparatus of FIG. 8A.

Referring to FIG. 9A, an elevational view similar to FIG. 8A and showing the composite laminate forming apparatus 100 is illustrated. In FIG. 9A, certain actuators of a matrix of electromechanical actuators 132 are actuated and extend towards the inverted layup mandrel 140 to lift one of the cut pieces 104 of fabric material towards the inverted layup mandrel 140 to adhere to the inverted layup mandrel 140. The inverted layup mandrel 140 may be pre-heated (pre-heating the mandrel) in combination with a resin that is pre-impregnated within carbon fabric raw material so that the first one of the cut pieces 104 can adhere to the inverted layup mandrel 140. FIG. 9B is a top view of the composite laminate forming apparatus of FIG. 9A.

More specifically, the matrix of electromechanical actuators 132 has a one-to-one correspondence to a matrix of actuatable pins 134 (FIG. 9A). Each electromechanical actuator 132 is independently controllable to thereby independently actuate the corresponding actuatable pin 134. Each pin 134 is independently actuatable such that shape of the cut piece 104 is supported by certain actuated pins when the cut piece 104 is lifted upward towards the inverted layup mandrel 140.

In one particular expression, the cut pieces 104 may be formed from a unidirectional piece of material. Once the backing material 103 is removed to expose the adherable (e.g., tacky) top surfaces 106 of the cut pieces 104, the actuatable pins 134 lift and press the cut pieces 104 against the inverted layup mandrel 140 and tack/compress the cut pieces 104 where desired and at the desired orientation as part of forming a ply with the same orientation. For example, the cut pieces 104 may be applied to the inverted layup mandrel 140 to form a continuous ply of unidirectional material. Then, another ply with possibly a different orientation may be applied on top of the prior applied ply using the actuatable pins 134.

The actuatable pins 134 and the matrix of electromechanical actuators 132 comprise an actuating mechanism. When certain pins of the matrix of actuatable pins 134 are actuated, the actuating mechanism lifts a cut piece 104 to a bottom surface of the inverted layup mandrel 140 to form at least a portion of a composite laminate on the bottom surface of the inverted layup mandrel 140. In particular, end surfaces of actuated pins of the matrix of actuatable pins 134 engage the cut piece 104 when the certain pins of the actuating mechanism are actuated to lift the cut piece 104 upward towards the inverted layup mandrel 140.

The mesh conveyor 130 has a mesh surface that defines the application surface on which the cut piece 104 is supported when the actuating mechanism is not actuated. More specifically, the mesh surface of the mesh conveyor 130 defines a first portion of the application surface, and end surfaces of actuated pins of the matrix of movable pins 134 define a second portion of the application surface. The actuatable pins 134 are operatively coupled to the electromechanical actuators 132 and are distributed throughout the mesh surface such that actuated pins extend through gaps (i.e., openings) in the mesh surface to engage and lift the cut piece 104 when the actuating mechanism (i.e., the electromechanical actuators corresponding to the actuated pins) is actuated. The belt conveyor 108 is in the form of a belt conveyor having a belt surface that is substantially parallel to the mesh surface of the mesh conveyor 130. The mesh surface of the mesh conveyor 130 and the belt surface of the belt conveyor 108 move together in sync so that cut pieces 104 can move from the belt conveyor 108 to the mesh conveyor 130 without hesitation.

More specifically, the mesh conveyor 130 is indexed to stop in alignment with the gaps in the mesh conveyor 130 and the locations of the electromechanical actuator pins 134. The electromechanical actuators 132 are set up at a constant pitch and array in a way to suit the physical size of the electromechanical actuator 132 and the gaps within the mesh of the mesh conveyor 130. The electromechanical actuators 132 and pins 134 are in retracted position so as to not interfere with the movement of the mesh conveyor 130.

Figure 11A:
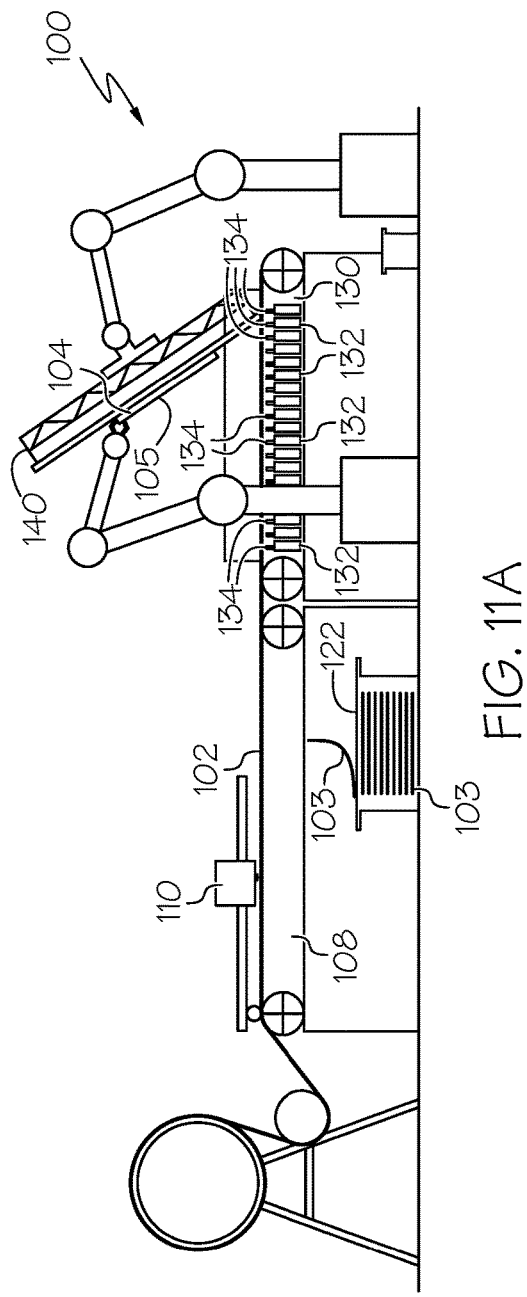
FIG. 11A is an elevational view similar to FIG. 10A and showing the composite laminate forming apparatus in which underside backing material is in process of being removed from the one cut piece of fabric material that is adhered to the inverted layup mandrel.
Figure 11B:
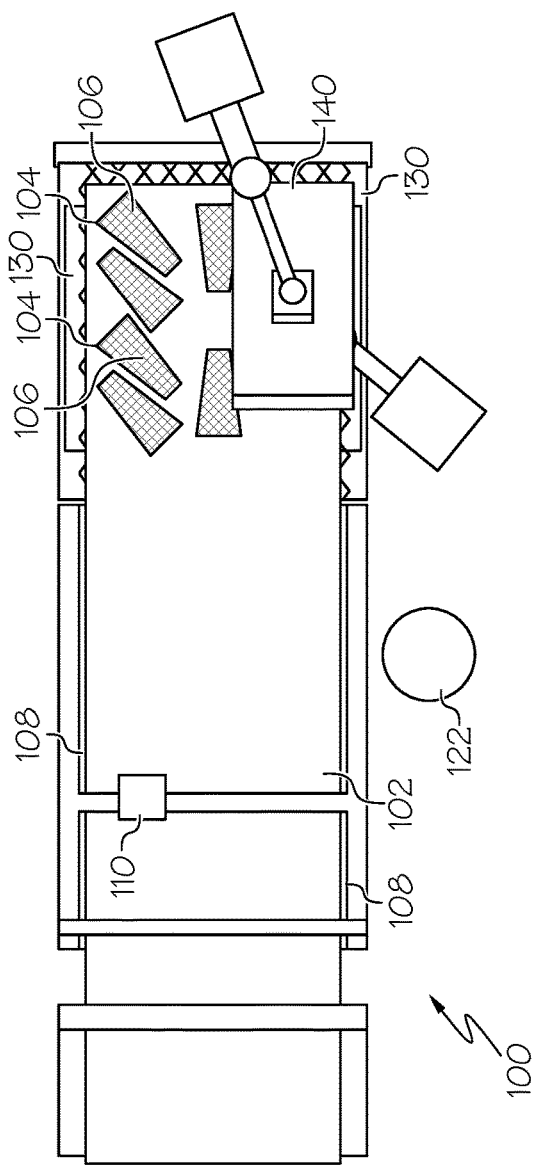
FIG. 11B is a top view of the composite laminate forming apparatus of FIG. 11A.

Referring to FIG. 10A, an elevational view similar to FIG. 9A and showing the composite laminate forming apparatus 100 is illustrated. In FIG. 10A, the certain actuators (i.e., the electromechanical actuators corresponding to the actuated pins shown in FIG. 9A) of the matrix of electromechanical actuators 132 are de-actuated and retracted away from the bottom surface of the inverted layup mandrel 140. FIG. 10B is a top view of the composite laminate forming apparatus of FIG. 10A. Then, as shown in FIG. 11A which is an elevational view similar to FIG. 10A, underside backing material 105 is in process of being removed from the one cut piece 104 that is adhered to the bottom surface of the inverted layup mandrel 140. FIG. 11B is a top view of the composite laminate forming apparatus of FIG. 11A.

Figure 12A:
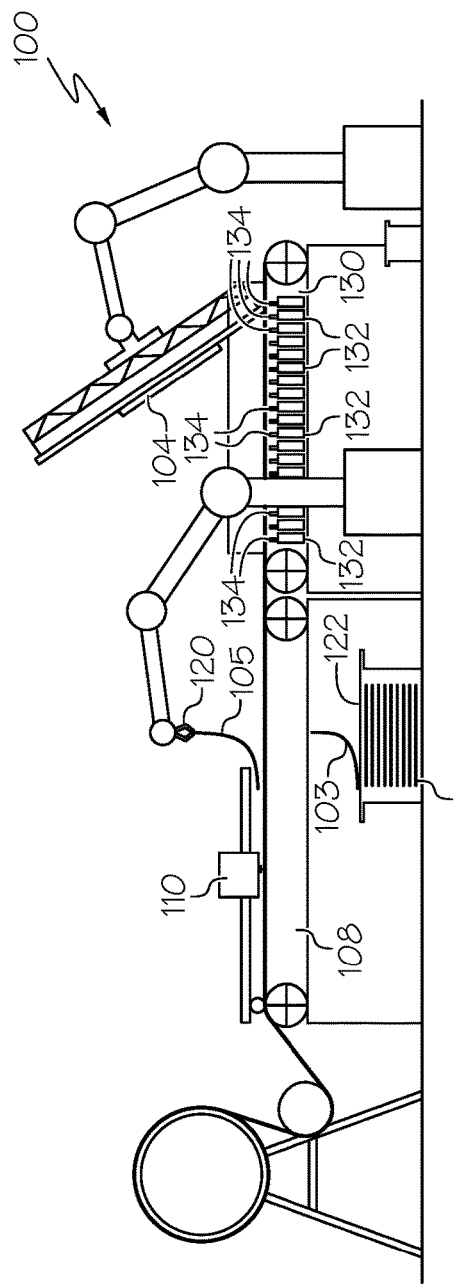
FIG. 12A is an elevational view similar to FIG. 11A and showing the composite laminate forming apparatus in which the removed underside backing material is in process of being discarded.
Figure 12B:
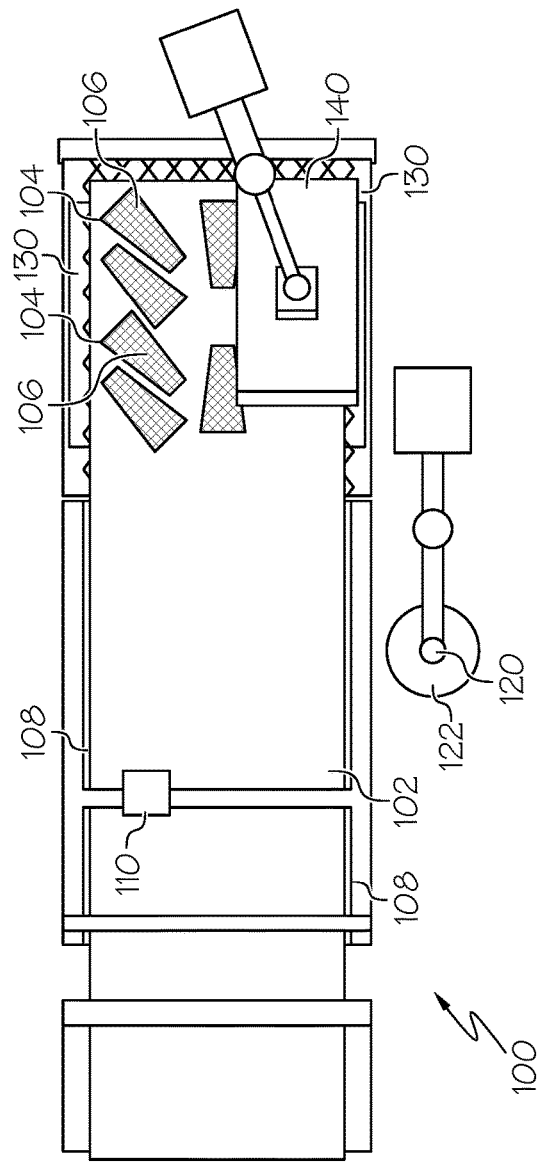
FIG. 12B is a top view of the composite laminate forming apparatus of FIG. 12A.

Referring to FIG. 12A, an elevational view similar to FIG. 11A and showing the composite laminate forming apparatus 100 in which the removed underside backing material 105 is in process of being discarded into the bin 122. FIG. 12B is a top view of the composite laminate forming apparatus of FIG. 12A. Then, as shown in FIG. 13A which is an elevational view similar to FIG. 12A, the removed underside backing material 105 is discarded into the bin 122. FIG. 13B is a top view of the composite laminate forming apparatus of FIG. 13A.

The above-described process of peeling away backing material 103 of one cut piece 104, lifting the cut piece 104, and then removing its underside backing material 105 is repeated for another one of the cut pieces 104 still on the mesh conveyor 130. The inverted layup mandrel 140 is controlled so that it is correctly positioned to receive the next cut piece that is lifted upwards towards the inverted layup mandrel 140 to adhere to the previous adhered cut piece. This process is continued until a composite laminate with a desired number of cut pieces (i.e., the desired number of plies of the composite laminate) is formed and positioned on the bottom surface of the inverted layup mandrel 140. The formed composite laminate, which may comprise only one cut piece (such as the cut piece 104 shown in FIG. 13A), is then manually removed from the bottom surface of the inverted layup mandrel 140.

Figure 14:
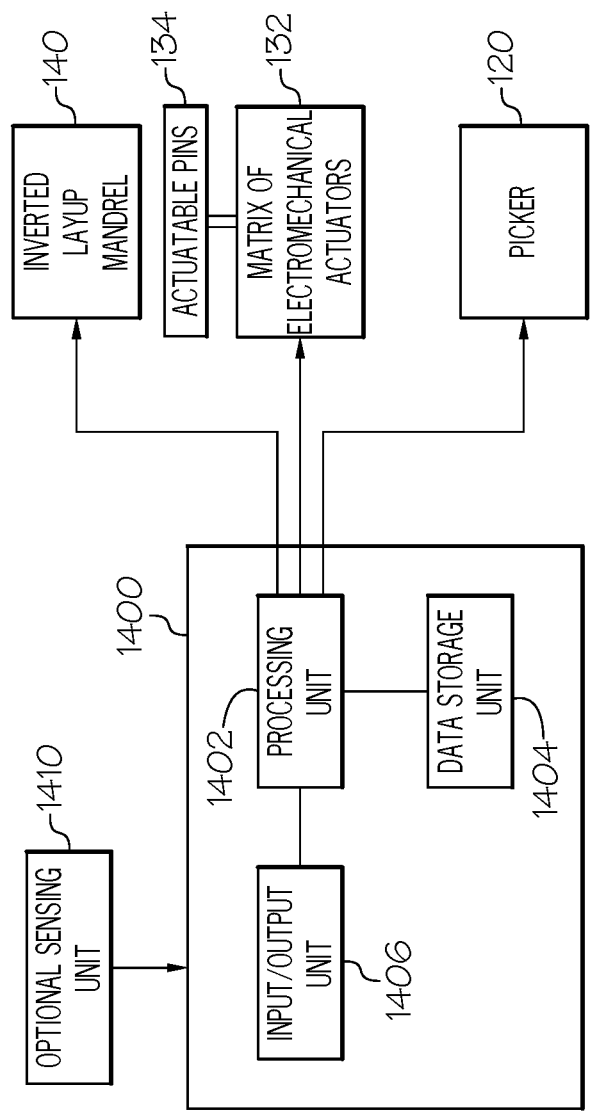
FIG. 14 is an example computer system associated with the apparatus of FIG. 1 and capable of controlling devices to form a composite laminate.

Referring to FIG. 14, an example computer system 1400 capable of controlling devices of the composite laminate forming apparatus 100 is illustrated. Electrical lines are shown as solid lines, and mechanical couplings are shown as double solid lines.

Computer system 1400 includes processing unit 1402 that executes instructions stored in internal data storage unit 1404, external data storage unit (not shown), or a combination thereof. Processing unit 1402 may comprise any type of technology. For example, processing unit 1402 may comprise a general-purpose electronic processor. Other types of processors and processing unit technologies are possible. Internal data storage unit 1404 may comprise any type of technology. For examples, internal data storage unit 1404 may comprise random access memory (RAM), read only memory (ROM), solid state memory, or any combination thereof. Other types of memories and data storage unit technologies are possible.

Computer system 1400 further includes a number of input/output (I/O) devices 1406 that may comprise any type of technology. For example, I/O devices 1406 may comprise a keypad, a keyboard, a touch-sensitive display screen, a liquid crystal display (LCD) screen, a microphone, a speaker, or any combination thereof. Other types of I/O devices and technologies are possible. An optional sensing unit 1410 provides input signals to the computer system 1400.

The processing unit 1402 controls the cutting machine 110 to cut pieces 104 of fabric material from the sheet 102 of composite fabric material, the picker 120 to remove backing material 103 from the cut pieces 104, the inverted layup mandrel 140 to position itself correctly relative to the cut pieces 104, and the matrix of electromechanical actuators 132 to control actuation of the actuatable pins 134, as will be described in more detail hereinbelow.

The computer system 1400 may comprise a computer numerically-controlled (CNC) based system. The CNC based system relies on location coordinates (e.g., (x, y, z) coordinates) that are part of the parameters of a pre-created CNC program that is stored in the data storage unit 1404 of the computer system 1400. The stored location coordinates enable control of the composite laminate forming apparatus 100 including the following.

The location coordinates of the cut pieces 104 on the bed/table of the cutting machine 110 are stored in the pre-created NC program. The stored location coordinates of a cut piece 104 tell the picker 120 the location where it needs to move to remove backing material 103 from the cut piece 104. Similarly, stored location coordinates of the bin 122 tell the picker 120 where it needs to move to discard the backing material 103. The stored coordinates of the cut piece 104 also tell the inverted layup mandrel 140 the location where it needs to move over the cut piece 104 to be laid up on the inverted layup mandrel 140. This process is repeated for all of the cut pieces 104.

Stored location coordinates are also used during transition of the cut pieces 104 from the belt conveyor 108 to the mesh conveyor 130. The movement of the cut pieces 104 from the belt conveyor 108 to the mesh conveyor 130 is synchronized and indexed to stop where required based upon location coordinates stored in the pre-created NC program. The location coordinates of a cut piece 104 over the mesh conveyor 130 tells which ones of the electromechanical actuators 132 are to be actuated. More specifically, only those electromechanical actuators 132 and actuator pins 134 that are within the perimeter of the cut piece 104 that is to be raised and adhered to the inverted layup mandrel 140 are actuated. As such, the actuated pins of the actuator pins 134 precisely support the shape of the cut composite ply during lifting from the mesh conveyor 130 system to application to the inverted layup mandrel 140. This process is repeated (in the required sequence) for the remaining cut pieces 104 to be raised and adhered to the inverted layup mandrel 140.

The pitch and sizes of the electromechanical actuators 132 as well as mesh size of the mesh conveyor 130 are also stored in the pre-created NC program. This information tells the mesh conveyor 130 the location where it needs to move to align appropriately so that the actuatable pins 134 can move through corresponding gaps in the mesh conveyor 130 to lift a cut piece 104 to the inverted layup mandrel 140. Accordingly, no sensors are needed to enable the computer system 1440 shown in FIG. 14 to control operation of the composite laminate forming apparatus 100 to form a composite laminate.

Although the above description describes the computer system 1400 as requiring no sensors to control operation of the composite laminate forming apparatus 100, it is conceivable that an optional sensing unit 1410 (FIG. 14) be provided to validate location of a cut piece 104 against the location indicated by the location coordinates stored in the NC program. Any detected differences in the location of a cut piece 104 can be adjusted accordingly (via the processing unit 1402) to accurately align the inverted layup mandrel 140 with the cut piece 104. The optional sensing unit 1410 may comprise an overhead camera/optical recognition system, for example.

Figure 15A:
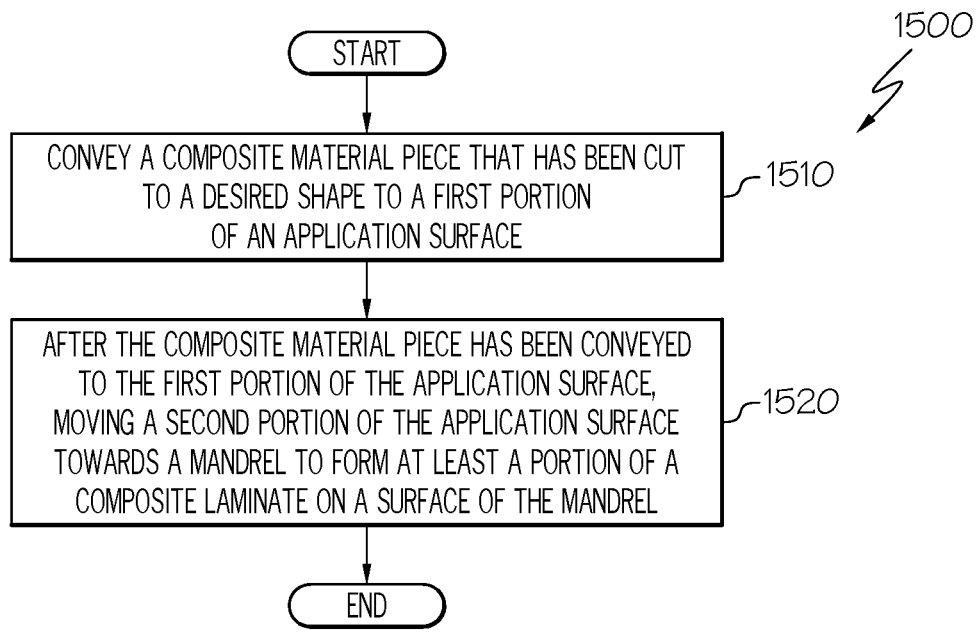
FIG. 15A is a flow diagram depicting an example method for forming a composite laminate in accordance with an embodiment.

Referring to FIG. 15A, flow diagram 1500 depicts an example method for operating the example computer system of FIG. 14 to control operation of the apparatus 100 to form a composite laminate in accordance with an embodiment. In block 1510, a composite material piece that has been cut to a desired shape is conveyed to a first portion of an application surface. In block 1520, after the composite material piece has been conveyed to the first portion of the application surface, a second portion of the application surface is moved towards a mandrel to form at least a portion of the composite laminate on a surface of the mandrel. The process then ends.

Figure 15B:
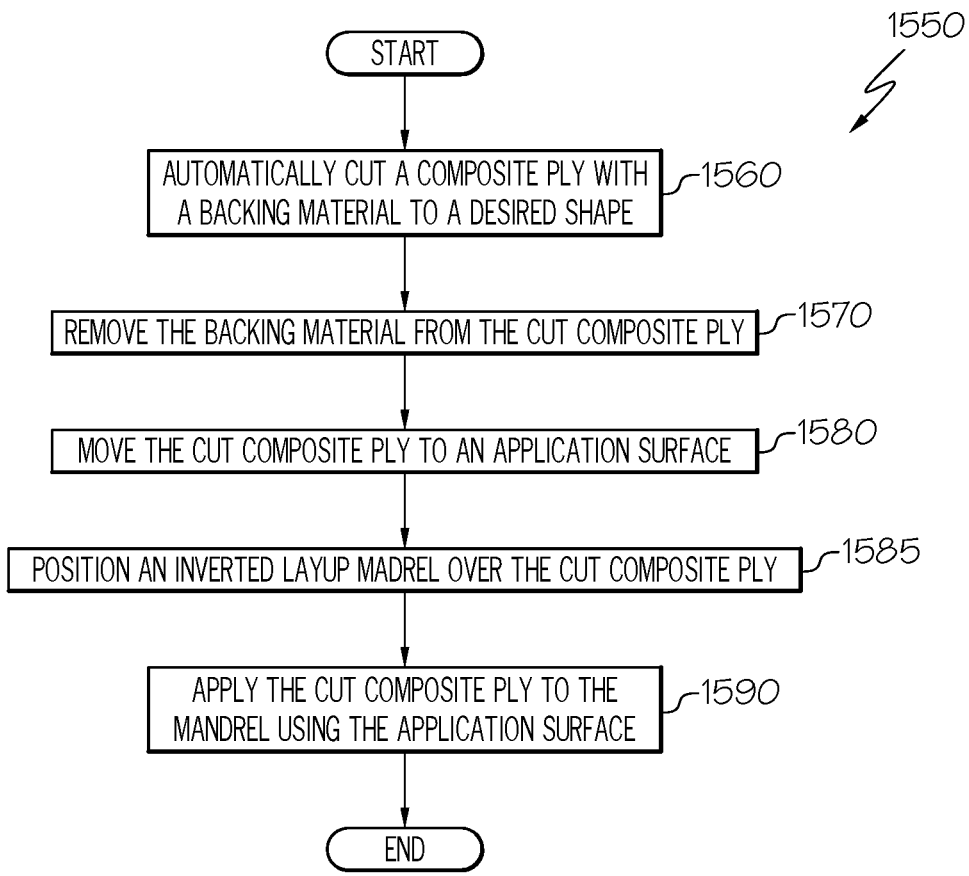
FIG. 15B is a flow diagram depicting an example method for forming a composite laminate in accordance with another embodiment.

Referring to FIG. 15B, flow diagram 1550 depicts an example method for operating the example computer system 1400 of FIG. 14 to control operation of the composite laminate forming apparatus 100 to form a composite laminate in accordance with another embodiment. In block 1560, a composite ply with a backing material is automatically cut to a desired shape. In block 1570, the backing material is removed from the cut composite ply. Then in block 1580, the cut composite ply is moved to an application surface. In block 1585, an inverted layup mandrel is positioned over the cut composite ply. For example, the step of positioning the mandrel may include aligning the mandrel relative to the cut composite ply such that the cut composite ply can be pressed at a desired location on the mandrel (e.g., an edge-to-edge orientation against a previously applied cut composite ply). The cut composite ply is applied to a mandrel using the application surface, as shown in block 1590. The process then ends.

While the step of applying the cut composite ply to a mandrel is primarily described as being performed by lifting the cut composite ply using a matrix of actuatable pins, various alternatives are also contemplated. In one alternative implementation, the step of applying the cut composite ply to a mandrel may be performed by lowering the mandrel into engagement with the cut composite ply to apply the cut composite ply to the mandrel.

It should be apparent that the above-described apparatus 100 uses the robotically-controlled picker 120 to peel off backing material 103 from cut pieces 104, and then place each cut piece 104 directly onto the inverted layup mandrel 140 using the matrix of customizable pins 134 that lift the piece against a bottom surface of the inverted layup mandrel 140. The need for operating personnel to pick up and move cut composite pieces to a layup mandrel is eliminated. As such, an automated process is provided to form a composite laminate. Accordingly, the automated process reduces potential damage to the formed composite laminate.

It should also be apparent that the inverted layup mandrel 140 is held (e.g., by a robot) in an upside-down position over the cut pieces 104 that are lying on the mesh conveyor 130. Cutting and layup are consolidated into a tighter space. This not only reduces factory floor space needed to form a composite laminate, but also reduces the time needed to form a composite laminate since the layup cycle time (i.e., the time between cutting composite pieces and laying up the cut composite pieces on a mandrel) is reduced. Thus, total production costs are reduced.

Although the above description describes a formed composite laminate that is substantially planar-shaped such as shown in FIG. 13A, it is conceivable that the formed composite laminate may have any contour, such as a formed composite laminate that has any number of curved surfaces.

Also, although the above description describes an actuating mechanism that uses an arrangement of the matrix of actuatable pins 134 and the matrix of electromechanical actuators 132, it is conceivable that an arrangement other than pins and electromechanical actuators be used to lift a cut piece 104 of fabric material upward towards the inverted layup mandrel 140. For example, pneumatically-charged actuators could be used in place of the electromechanical actuators 132. As another example, hydraulically-charged actuators could be used in place of the electromechanical actuators 132.

Figure 16:
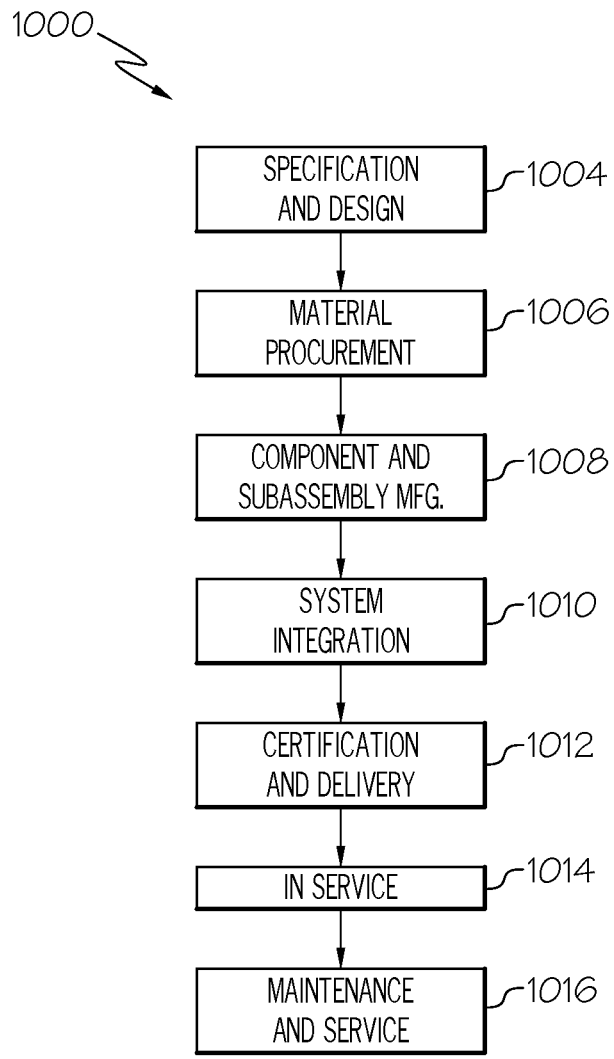
FIG. 16 is a flow diagram of an aircraft manufacturing and service methodology.
Figure 17:
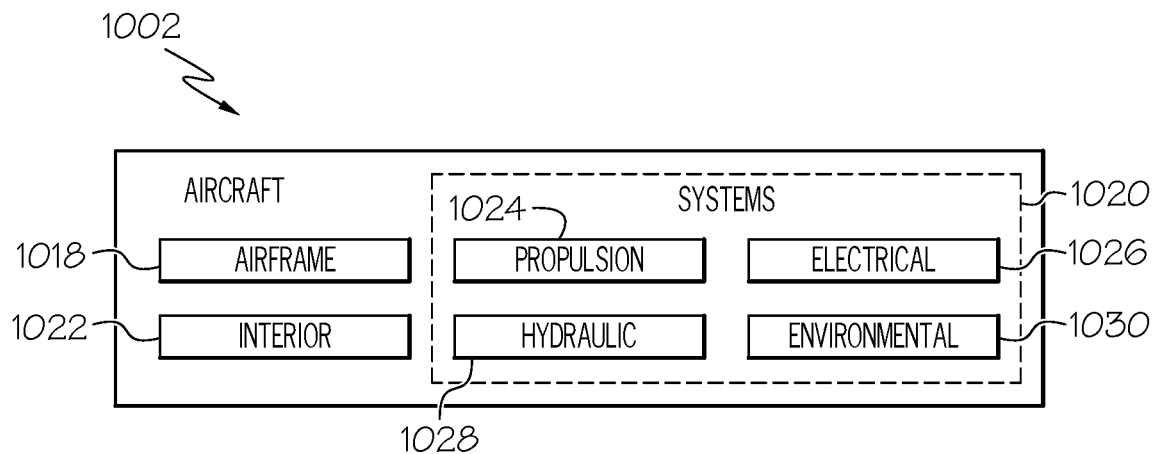
FIG. 17 is a block diagram of an aircraft.

Examples of the disclosure may be described in the context of an aircraft manufacturing and service method 1000, as shown in FIG. 16, and an aircraft 1002, as shown in FIG. 17. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 17, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed apparatus and method may be employed during any one or more of the stages of the aircraft manufacturing and service method 1000. As one example, components or subassemblies corresponding to component/subassembly manufacturing 1008, system integration 1010, and/or maintenance and service 1016 may be assembled using the disclosed apparatus method. As another example, the airframe 1018 may be constructed using the disclosed apparatus and method. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

Aspects of disclosed embodiments may be implemented in software, hardware, firmware, or a combination thereof. The various elements of the system, either individually or in combination, may be implemented as a computer program product (program of instructions) tangibly embodied in a machine-readable storage device (storage medium) for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

The above-described apparatus and method are described in the context of an aircraft. However, one of ordinary skill in the art will readily recognize that the disclosed apparatus and method are suitable for a variety of applications, and the present disclosure is not limited to aircraft manufacturing applications. For example, the disclosed apparatus and method may be implemented in various types of vehicles including, for example, helicopters, passenger ships, automobiles, marine products (boat, motors, etc.) and the like. Non-vehicle applications are also contemplated.

Also, although the above-description describes an apparatus and method for forming a composite laminate for an airplane part in the aviation industry in accordance with military and space regulations, it is contemplated that the apparatus and method may be implemented to facilitate forming a composite laminate in any industry in accordance with the applicable industry standards. The specific apparatus and method can be selected and tailored depending upon the particular application.

Further, although various aspects of disclosed embodiments have been shown and described, modifications may occur to those skilled in the art upon reading the specification. The present application includes such modifications and is limited only by the scope of the claims.

What is claimed is:

1. A method for forming a composite laminate, the method comprising:
    conveying a composite material piece that has been cut to a desired shape to a first portion of an application surface; and
    after the composite material piece has been conveyed to the first portion of the application surface, moving a second portion of the application surface towards a mandrel to form at least a portion of the composite laminate on a surface of the mandrel, wherein the first portion of the application surface is stationary during the step of moving the second portion of the application surface.

2. The method of claim 1 wherein the mandrel is in an inverted position and wherein moving the second portion of the application surface towards the mandrel to form the at least a portion of the composite laminate on the surface of the mandrel includes:
    lifting the second portion of the application surface upward towards the mandrel to form the at least a portion of the composite laminate on a bottom surface of the mandrel.

3. The method of claim 2 wherein lifting the second portion of the application surface upward towards the mandrel to form the at least a portion of the composite laminate on the bottom surface of the mandrel includes:
    actuating certain pins of a matrix of actuatable pins to lift the composite material piece upward towards the mandrel.

4. The method of claim 1 wherein moving the second portion of the application surface towards the mandrel to form the at least a portion of the composite laminate on the surface of the mandrel includes:
    automatically moving the second portion of the application surface towards the mandrel.

5. The method of claim 1 further comprising:
    automatically removing backing material from the composite material piece that has been cut to the desired shape.

6. The method of claim 1 further comprising:
    removing backing material from the composite material piece before the composite material piece is conveyed to the first portion of the application surface.

7. The method according to claim 1 wherein the method is controlled by a computer having a memory executing one or more program of instructions which are tangibly embodied in a storage medium readable by the computer.

8. A method for forming a composite laminate comprising:
    providing a sheet of composite material having a backing material thereon to a conveyor;
    automatically cutting the sheet of composite material to form a cut composite ply with the backing material thereon to a desired shape while the sheet of composite material is on the conveyor;
    removing the backing material from the cut composite ply while the cut composite ply is on the conveyor;

moving the cut composite ply to an application surface using the conveyor; and applying the cut composite ply to a mandrel from the application surface.

9. The method of claim 8 wherein the application surface is a mesh conveyor.

10. The method of claim 9 wherein the step of applying the cut composite ply to the mandrel includes:

lifting the cut composite ply using a matrix of actuatable pins from the mesh conveyor to apply the cut composite ply to the mandrel.

11. The method of claim 10 wherein the step of lifting the cut composite ply using the matrix of actuatable pins includes:

actuating at least one actuatable pin of the matrix of actuatable pins to precisely support a shape of the cut composite ply during the lifting of the cut composite ply from the mesh conveyor to the mandrel.

12. The method of claim 11 further comprising:

locating the mandrel relative to a location of the cut composite ply lifted above the mesh conveyor.

13. The method of claim 11 further comprising:

robotically locating the mandrel relative to a location of the cut composite ply lifted above the mesh conveyor.

14. The method of claim 8 wherein the step of applying the cut composite ply to the mandrel comprises applying the cut composite ply in an edge-to-edge orientation against a previously applied cut composite ply.

15. The method of claim 8 further comprising:

robotically picking the backing material from the cut composite ply to remove the backing material.

16. The method of claim 8 further comprising:

lowering the mandrel into engagement with the cut composite ply to apply the cut composite ply to the mandrel.

17. The method of claim 8 further comprising pre-heating the mandrel.

18. A method for forming a composite laminate, the method comprising:

supporting a cut composite ply on a mesh surface; and lifting the cut composite ply using actuated pins of a matrix of actuatable pins to apply the cut composite ply to a mandrel to form at least a portion of the composite laminate on a surface of the mandrel, wherein the actuated pins extend through openings in the mesh surface to lift the cut composite ply.

19. The method of claim 18, further comprising actuating a matrix of electromechanical actuators to lift the actuated pins of the matrix of actuatable pins.

20. The method of claim 18, further comprising actuating a matrix of pneumatically-charged actuators to lift the actuated pins of the matrix of actuatable pins.

* * * * *